3,340,257
**7-(α- OR β-AZIDO ACYLAMINO) CEPHALOSPO-
RANIC ACID AND DERIVATIVES THEREOF**
Tadayoshi Takano, Hirakata, Kiyoshi Hattori, Ibaragi,
and Teiji Kishimoto, Kyoto, Japan, assignors to Fujisawa Pharmaceutical Co., Ltd., Osaka, Japan, a company of Japan
No Drawing. Filed July 20, 1965, Ser. No. 473,516
Claims priority, application Japan, July 23, 1964,
39/42,125, 39/42,126
8 Claims. (Cl. 260—243)

This invention relates to 7-(α- or β-azido acylamino) cephalosporanic acid and derivatives thereof, which compounds are useful as antimicrobial agents.

The compounds of this invention may be represented by the following structural Formula I:

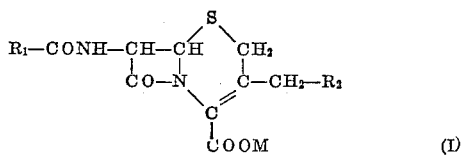

wherein $R_1$ is

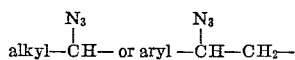

$R_2$ is acetoxy or pyridinium group and M is hydrogen atom, a pharmaceutically acceptable non-toxic cation or an anionic charge.

In the above formula, alkyl includes a strain, branched or cyclic alkyl containing one to eight carbon atoms such as methyl, ethyl, propyl, butyl, isobutyl, pentyl, hexyl, octyl, isooctyl, cyclopentyl or cyclohexyl, etc. and aryl includes phenyl, naphthyl, tolyl, etc. and pharmaceutically acceptable non-toxic cation of M includes, for example, the alkali metal ion such as sodium or potassium ion, ammonium ion and the organic quaternary ammonium cation such as triethyl ammonium, dicyclohexyl ammonium, diphenylenediammonium or dibenzylethylenediammonium.

The compound of Formula I of this invention may be prepared by reacting 7-aminocephalosporanic acid or a derivative thereof having the Formula II:

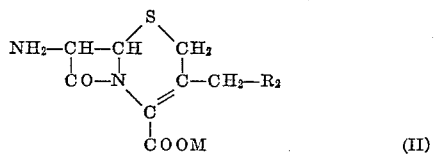

with an α- or β-azido carboxylic acid having the Formula III:

<div style="text-align:center">$R_1$—COOH        (III)</div> or a reactive derivative thereof,
wherein $R_1$, $R_2$ and M are the same as those described in Formula I.

7-aminocephalosporanic acid (7 - amino - 3 - acetoxymethyl-3-cephem-4-carboxylic acid) which is one of the starting material of Formula II is a known compound and can be obtained upon hydrolysis of the antibiotic Cephalosporin C [Biochemical Journal 79, 408–416 (1961)].

When using an α- or β-azido carboxylic acid, the reaction is preferably carried out in the presence of a condensing agent such as dicyclohexylcarbodiimide, N-cyclohexyl-N'-morpholinoethylcarbodiimide, pentamethyleneketene-N-cyclohexylimine, N-ethyl-o-phenylisoxazolium - 3'-sulfonate, phosphorus trichloride, etc. Under such circumstances, it is believed that the reaction may mainly proceed through an active form of the carboxyl radical in the α- or β-azido carboxylic acid or of the amino radical in 7-aminocephalosporanic acid.

Examples of reactive derivatives of the α- or β-azido carboxylic acid may be mentioned the acid halide, acid anhydride, acid amide, acide ester and so forth. The acid halide is preferably used as the reactive derivative of the α- or β-azido carboxylic acid. But these reactive derivatives are suitably selected in accordance with the kinds of the α- or β-azido carboxylic acid to be used.

The reaction is usually carried out in the presence of a solvent. In the solvent may be mentioned acetone, dioxane, acetonitrile, chloroform, ethylene chloride, tetrahydrofuran, or other organic solvents which are inert in the reaction and are used commonly. Of these solvents, the hydrophylic ones may be used with water.

Also, the reaction may be carried out in the presence of a base such as alkali metal hydrogen carbonate, trialkylamine, pyridine, etc. The reaction is carried out in almost every case under cooling or at room temperature though the temperature is not particularly limited.

After completion of the reaction, the reaction produce is separated according to the conventional methods known in the arts.

When using the compound of Formula II wherein M is a pharmaceutically acceptable non-toxic cation as a starting compound, an object compound of Formula I wherein M is hydrogen is mainly obtained, because the dissociation of the cation tends to occur during the separation of the reaction product. Therefore, if it is desired to obtain the object compound of Formula I wherein M is a pharmaceutically acceptable non-toxic cation, the compound of Formula I wherein M is hydrogen is treated with an appropriate compound such as sodium hydroxide, potassium hydroxide, sodium α-ethylhexanoate, triethylamine, dicyclohexylamine, diphenylenediamine or dibenzylethylenediamine.

In addition, the compound of Formula I wherein $R_2$ is pyridinium may be obtained by reacting the compound of Formula I wherein $R_2$ is acetoxy, with pyridine.

Both 7-aminocephalosporanic acid or a derivative thereof to be used in the reaction of this invention and the object compound of Formula I are comparatively unstable and tend to decompose during treatment. Therefore, it is preferable to carry out the reaction and separation under mild condition.

Thus obtained compound of Formula I not only demonstrates resistance to penicillinase and an acid, but exhibits advantageous physiological properties and activity against a wide variety of microorganisms. Furthermore, the compound of Formula I shows high blood levels after administration to mice.

The following examples will illustrate the types of compounds available in accordance with this invention.

In the examples, "MIC" means a minimum inhibitory concentration which is measured by the serial dilution method commonly employed in bioassay of antimicrobial compounds.

EXAMPLE 1

(i) *7-(2-azidooctanamido) cephalosporanic acid*

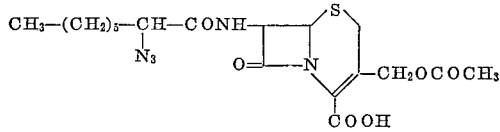

7 - aminocephalosporanic acid (300 mg.) and 2-azidooctanoylchloride prepared from 200 mg. of 2-azidooctanoic acid and thionyl chloride, were dissolved in 0.3 cc. of triethylamine and 20 cc. of chloroform. This solution was stirred for 2.5 hours under ice-cooling and allowed to stand for one day. The reaction mixture was filtered after adjusting the pH to 2. Chloroform was distilled off from the filtrate under reduced pressure, and the residue was washed with ether to obtain 175 mg. of 7-(2-azidooctanamido) cephalosporanic acid as crystals having M.P. 114–118° C. (dec.).

UV: $\lambda_{max.}^{80\%\ C_2H_5OH \cdot NaOH}$ 260 m$\mu$, E 163

MIC: *Escherichia coli* >40 $\gamma$/cc., *Staphylococcus aureus* 0.2 $\gamma$/cc.

The substance above obtained and 6-(5-methyl-3-phenylisoxazole-4-carbonamido)penicillanic acid, show equal effectiveness against experimental *Streptococcus hemolyticus* S-23 infection in mice, when orally administered in doses of 6 mg. each.

(ii) *7-(2-azidooctanamido)-3pyridiniummethyl-decephalosporanic acid inner salt*

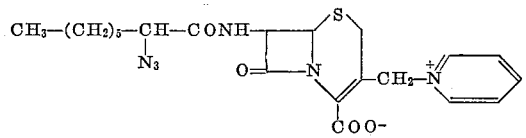

7-(2-azidooctanamido) cephalosporanic acid (1.8 g.) dissolved in 10 cc. of water and 15 cc. of pyridine was stirred at 50° C. for 8 hours and then allowed to stand at 45° C. for 16 hours. The reaction mixture was condensed under reduced pressure. The residue was washed with 20 cc. of ethyl acetate twice and then extracted with 60 cc. of 10% aqueous alcohol. To this extract solution was added 4 cc. of an anion exchange resin [Dowex 1×8 (acetate-type)] and shaken for 5 minutes at room temperature. The resulting solution, from which the resin was removed off, was condensed under reduced pressure and dried to obtain 170 mg. of 7-(2-azidooctanamido)-3-pyridiniummethyl-decephalosporanic acid inner salt having M.P. 147–151° C. (dec.).

UV: $\lambda_{max.}^{95\%\ C_2H_5OH}$ 258 m$\mu$, E 76

$\lambda_{min.}^{95\%\ C_2H_5OH}$ 222 m$\mu$, E 21

(iii) *Sodium salt of 7-(2-azidooctanamido) cephalosporanic acid*

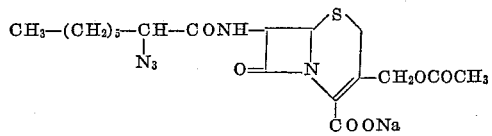

To 2.4 g. of 7-(2-azidooctanamido) cephalosporanic acid dissolved in 40 cc. of ethyl acetate, was added 20 cc. of water. This solution was added with an ½ N aqueous sodium hydroxide solution to adjust the pH to 6.4–6.8. The water layer was washed with 10 cc. of ethyl acetate and condensed under reduced pressure. After drying, the residue was washed with acetone and dried under reduced pressure to obtain 1.95 g. of sodium salt of 7-(2-azidooctanamido) cephalosporanic acid having M.P. 151–156° C. (dec.).

UV: $\lambda_{max.}^{H_2O}$ 258 m$\mu$, E 106

(iv) *Dicyclohexylamine salt of 7-(2-azidooctanamido) cephalosporanic acid*

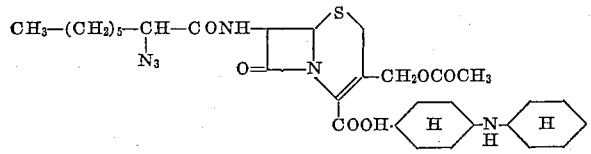

The substance (480 mg.) obtained in (i) was dissolved in the mixture of acetone and ether (1:1). To this solution was added an acetone solution of dicyclohexylamine and allowed to stand in an ice-box to obtain 290 mg. of dicyclohexylamine salt of 7-(2-azidooctanamido) cephalosporanic acid as crystals having M.P. 170–175° C. (dec.).

UV: $\lambda_{max.}^{95\%\ C_2H_5OH}$ 265 m$\mu$, E 116

MIC: *Escherichia coli* >40 $\gamma$/cc., *Staphylococcus aureus* 0.2 $\gamma$/cc., *Diplococcus pneumoniae* III 0.16 $\gamma$/cc., *Streptococcus hemolyticus* S-23 0.16 $\gamma$/cc.

EXAMPLE 2

(i) *7-(2-azidoisobutanamido) cephalosporanic acid*

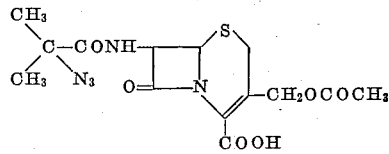

2-azidoisobutyloyl chloride prepared from 1.4 g. of 2-azidoisobutylic acid and thionyl chloride, was dissolved in acetone, to which solution were added dropwise under stirring, 2.0 g. of 7-aminocephalosporanic acid and 1.7 g. of sodium hydrogen carbonate in 50% aqueous acetone. The reaction mixture was allowed to react for 2 hours under ice-cooling and then for 3 hours at room temperature. The reaction solution was acidified, extracted with ethyl acetate and dried, after which the solvent was distilled off. The residue was washed with hexane to obtain 2.33 g. of 7-(2-azidoisobutanamido) cephalosporanic acid.

MIC: *Escherichia coli* >40 $\gamma$/cc., *Staphylococcus aureus* 20 $\gamma$/cc.

(ii) *Sodium salt of 7-(2-azidoisobutanamido) cephalosporanic acid*

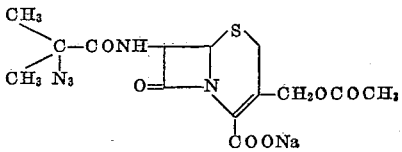

The substance (330 mg.) obtained in (i) was dissolved in the mixture of acetone and ether (1:1). To this solution, was added sodium α-ethylhexanoate and allowed to stand in an ice-box to obtain 83 mg. of sodium salt of 7-(2-azidoisobutanamido) cephalosporanic acid as hygroscopic powders having M.P. 95–127° C. (dec.).

UV: $\lambda_{max.}^{H_2O}$ 261 m$\mu$, E 186

(iii) *Dicyclohexylamine salt of 7-(2-azidoisobutanamido) cephalosporanic acid*

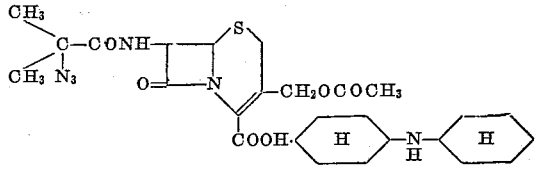

The substance (300 mg.) obtained in (i) was dissolved in the mixture of acetone and ether (1:1). To this solution was added dicyclohexylamine equivalent to 7-(2-azidoisobutanamido) cephalosporanic acid and allowed to stand in an ice-box to obtain 263 mg. of dicyclohexylamine salt of 7-(2-azidoisobutanamido) cephalosporanic acid as crystals having M.P. 175–176° C. (dec.).

UV: $\lambda_{max.}^{95\%\ C_2H_5OH}$ 265 m$\mu$, E 143

EXAMPLE 3

*7-(3-phenyl-3-azidopropionamido) cephalosporanic acid*

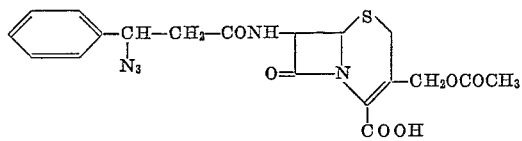

To 150 mg. of 7-aminocephalosporanic acid in 0.4 cc. of triethylamine and 10 cc. of chloroform was added a chloroform solution of 300 mg. of 3-phenyl-3-azidopropionyl chloride. This solution was stirred for 2 hours under ice-cooling and further for 4 hours at room temperature. The reaction mixture was condensed under reduced pressure and after adjusting the pH to 3.0 the residue was extracted with ethyl acetate. The extract solution was also condensed under reduced pressure and the resulting residue was washed with ether to obtain 64 mg. of 7-(3-phenyl-3-azidopropionamido) cephalosporanic acid as powers having M.P. 175° C. (dec.).

UV: $\lambda_{max.}^{80\%\ C_2H_5OH\cdot NaOH}$ 267 m$\mu$, E 209

MIC: *Escherichia coli* >40 $\gamma$/cc., *Staphylococcus aureus* 1.0 $\gamma$/cc.

We claim:
1. A compound having the general formula:

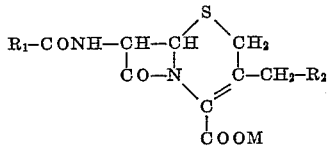

wherein $R_1$ is alkyl

in which the alkyl is a straight or branched chain containing 1 to 7 carbon atoms; $R_2$ is acetoxy or pyridinium group; and M is hydrogen alkali metal, a dicyclohexylammonium group or an anionic charge.

2. 7-(2-azidooctanamido) cephalosporanic acid.
3. 7-(2-azidoisobutanamido) cephalosporanic acid.
4. 7-(2-azidooctanamido) - 3 - pyridiniummethyl - decephalosporanic acid inner salt.
5. Sodium salt of 7-(2-azidooctanamido) cephalosporanic acid.
6. Sodium salt of 7-(2-azidoisobutanamido) cephalosporanic acid.
7. Dicyclohexylamine salt of 7-(2-azidooctanamido) cephalosporanic acid.
8. Dicyclohexylamine salt of 7-(2-azidoisobutanamido) cephalosporanic acid.

References Cited
UNITED STATES PATENTS

| | | | |
|---|---|---|---|
| 3,228,930 | 1/1960 | Sjoberg et al. | 260—239.1 |
| 3,252,973 | 5/1966 | Flynn | 260—239.1 |

NICHOLAS S. RIZZO, *Primary Examiner.*